(12) United States Patent
Durresi et al.

(10) Patent No.: US 7,236,238 B1
(45) Date of Patent: Jun. 26, 2007

(54) METHOD AND APPARATUS FOR MONITORING THE QUALITY OF OPTICAL LINKS

(75) Inventors: Arjan Durresi, Columbus, OH (US); Betty Lise Anderson, Gahanna, OH (US)

(73) Assignee: The Ohio State University, Columbus, OH (US)

( * ) Notice: Subject to any disclaimer, the term of this patent is extended or adjusted under 35 U.S.C. 154(b) by 0 days.

(21) Appl. No.: 10/726,771

(22) Filed: Dec. 2, 2003

Related U.S. Application Data

(60) Provisional application No. 60/430,207, filed on Dec. 2, 2002, provisional application No. 60/430,213, filed on Dec. 2, 2002, provisional application No. 60/430,214, filed on Dec. 2, 2002.

(51) Int. Cl.
  *G01N 21/00* (2006.01)
(52) U.S. Cl. .................................... 356/73.1
(58) Field of Classification Search ............... 356/73.1; 398/9–11, 39–99, 110–124; 250/227.16
  See application file for complete search history.

(56) References Cited

U.S. PATENT DOCUMENTS

| | | | |
|---|---|---|---|
| 3,428,391 A | 2/1969 | Newcomer | |
| 3,755,676 A | 8/1973 | Kinsel | |
| 3,892,468 A | 7/1975 | Duguay | |
| 4,225,938 A | 9/1980 | Turpin | |
| 4,344,671 A | 8/1982 | Lang | |
| 4,474,434 A | 10/1984 | Carlsen et al. | |
| 4,474,435 A | 10/1984 | Carlsen et al. | |
| 4,546,249 A | 10/1985 | Whitehouse et al. | |
| 4,929,956 A | 5/1990 | Lee et al. | |
| 5,018,816 A | 5/1991 | Murray et al. | |
| 5,117,239 A | 5/1992 | Riza | |
| 5,276,758 A | 1/1994 | Hughes | |
| 5,319,477 A | 6/1994 | DeJule | |
| 5,418,880 A | 5/1995 | Lewis et al. | |
| 5,463,497 A | 10/1995 | Muraki et al. | |
| 5,465,175 A | 11/1995 | Woodgate et al. | |
| 5,512,907 A | 4/1996 | Riza | |
| 5,592,333 A | 1/1997 | Lewis | |
| 5,623,360 A | 4/1997 | Gesell et al. | |
| 5,724,163 A | 3/1998 | David | |
| 5,726,752 A | 3/1998 | Uno et al. | |
| 5,767,956 A * | 6/1998 | Yoshida | 356/73.1 |

(Continued)

OTHER PUBLICATIONS

Anderson, et al., Increasing Efficiency of Optical Beam Steerers, Draft Technical Report #3 for Harris Corporation, The Ohio State University, May 30, 2003, pp. 1-11.

(Continued)

*Primary Examiner*—Tu T. Nguyen
(74) *Attorney, Agent, or Firm*—Calfee Halter & Griswold LLP

(57) ABSTRACT

A method and apparatus for monitoring the quality of an optical link is disclosed. According to a first aspect of the present invention, a method for determining a quality of an optical link is disclosed. The method includes identifying a known signal and transmitting and receiving the signal over an optical link. The method also includes comparing the received signal to the known signal using optical correlation. The method further includes determining a quality of the optical link based on the comparison.

20 Claims, 5 Drawing Sheets

U.S. PATENT DOCUMENTS

| | | | |
|---|---|---|---|
| 5,852,693 | A | 12/1998 | Jeong |
| 5,859,697 | A | 1/1999 | Lopez et al. |
| 5,936,759 | A | 8/1999 | Buttner |
| 5,973,727 | A | 10/1999 | McGrew et al. |
| 6,014,244 | A | 1/2000 | Chang |
| 6,040,880 | A | 3/2000 | Tsuboi |
| 6,064,506 | A | 5/2000 | Koops |
| 6,181,367 | B1 | 1/2001 | McGrew et al. |
| 6,188,817 | B1 | 2/2001 | Goodfellow |
| 6,236,506 | B1 | 5/2001 | Cao |
| 6,266,176 | B1 | 7/2001 | Anderson et al. |
| 6,323,981 | B1 * | 11/2001 | Jensen ................... 398/11 |
| 6,388,815 | B1 | 5/2002 | Collins, Jr. et al. |
| 6,480,323 | B1 | 11/2002 | Messner et al. |
| 6,522,404 | B2 | 2/2003 | Mikes et al. |
| 6,525,889 | B1 | 2/2003 | Collins, Jr. et al. |
| 6,535,340 | B1 | 3/2003 | Saruwatari |
| 6,647,164 | B1 | 11/2003 | Weaver et al. |
| 6,674,939 | B1 | 1/2004 | Anderson et al. |
| 6,711,316 | B2 | 3/2004 | Ducellier |
| 6,724,535 | B1 | 4/2004 | Clabburn |
| 6,724,951 | B1 | 4/2004 | Anderson et al. |
| 6,734,955 | B2 * | 5/2004 | Wight et al. ............... 356/73.1 |
| 6,760,140 | B1 | 7/2004 | Argueta-Diaz et al. |
| 6,934,069 | B2 | 8/2005 | Moon et al. |
| 6,952,306 | B1 | 10/2005 | Anderson |
| 6,958,861 | B1 | 10/2005 | Argueta-Diaz |
| 2002/0030814 | A1 | 3/2002 | Mikes et al. |
| 2003/0202731 | A1 | 10/2003 | Ionov et al. |
| 2004/0190823 | A1 | 9/2004 | Leuthold et al. |
| 2005/0007668 | A1 | 1/2005 | Serati et al. |

OTHER PUBLICATIONS

Anderson et al., Binary-Counting True Time Delay Generator Using a White Cell Design and Deformable Mirror Devices, LEOS, Orlando, FL, Dec. 1998, 2 pgs.

Anderson et al., Design Advances in Free-Space Optical True-Time Delay Device, PSAA-8, Monterey, CA, Jan. 1998, 3 pgs.

Anderson et al., Highly Parallel Optical Device to Produce True Time Delays for Phased Array Antennas, Allerton, Sep. 1998, 14 pgs.

Anderson et al., Optically Produced True-Time Delays for Phased Antenna Arrays, Applied Optics, vol. 36, No. 32, Nov. 20, 1997, pp. 8493-8503.

Anderson et al., Optical Cross-Connect Based on Tip/Tilt Micromirrors in a White Cell, IEEE Journal of Selected Topics in Quantum Electronics, vol. 9, No. 2, Mar./Apr. 2003, pp. 579-593.

Anderson, et al. Optical Interconnection Device Based on the White Cell, presentation at Notre Dame University Nov. 6, 2002, 46 pgs.

Anderson, Optical Interconnections, Optical True-Time Delays, and More . . . , presentation at University of Colorado Jan. 28, 2003, 61 pgs.

Anderson, et al., Polynomial-based optical true-time delay devices with microelectromechanical mirror arrays, Applied Optics, vol. 41, No. 26, Sep. 10, 2002, pp. 5449-5461.

Argueta-Diaz, et al. Reconfigurable Photonic Switch Based on a Binary System Using the White Cell and Micromirror Arrays, IEEE Journal of Selected Topics in Quantum Electronics, vol. 9, No. 2, Mar./Apr. 2003, pp. 594-602.

Chen et al., 1-to-12 Surface Normal Three-Dimensional Optical Interconnects, Applied Physics Letters 63(14), Oct. 4, 1993, pp. 1883-1885.

Cohen et al., Optically Controlled Serially Fed Phased Array Sensor, IEEE Photonics Technology Letters, vol. 8, No. 12, Dec. 1996, pp. 1683-1685.

Collins et al., Numerical Optical Data Processing, Proceedings of the 1978 International Optical Computing Conference, London, England, Sep. 1978, pp. 194-197.

Collins et al., Optics for Numerical Calculations, Proceedings of ICO-11 Conference, Madrid, Spain, 1978, pp. 311-314.

Collins, Jr. et al., Optical True Time Delay for Phased Array Antennas Based on the White Cell, GOMAC, Monterey, CA, Mar. 1999, 4 pgs.

Collins, Numerical Optical Data Processor, SPIE, vol. 128, Effective Utilization of Optics in Radar Systems, 1977, pp. 313-319.

Ewing et al., Advancements in LCoS Optical Phased Array Technology, SPIE Great Lakes Regional Symposium, Cleveland, OH, Jun. 7, 2004, pp. 1-23.

Fairley et al., The Microphotonics Revolution, Mit's Magazine of Innovation, Technology Review, Jul./Aug. 2000, pp. 38-44.

Freitag et al., A Coherent Optically Controlled Phased Array Antenna System, IEEE Microwave and Guided Wave Letters, vol. 3, No. 9, Sep. 1993, pp. 239-295.

Goutzoulis et al., Hybrid Electronic Fiber Optic Wavelength-Multiplexed System for True Time-Delay Steering of Phased Array Antennas, Optical Engineering, vol. 31, No. 11, Nov. 1992, pp. 2312-2322.

Higgins et al., Design and demonstration of a switching engine for a binary true-time-delay device that uses a White cell, Applied Optics, vol. 42, No. 23, Aug. 10, 2003, pp. 4747-4757.

Li et al., Angular Limitations of Polymer-Based Waveguide Holograms for 1-to-many V-shaped Surface-Normal Optical Interconnects, Applied Physics Letters 65(9), Aug. 29, 1994, pp. 1070-1072.

Liu et al., Cascaded Energy-Optimized Linear Volume Hologram Array for 1-to-many Surface-Normal Even Fan-Outs, Optics and Laser Technology, vol. 29, No. 6, 1997, pp. 321-325.

Rader, et al., Demonstration of a Linear Optical True-time Delay Device by Use of a Microelectromechanical Mirror Array Optics, vol. 42, No. 8, Mar. 10, 2003, pp. 1409-1416.

Saleh et al., Fundamentals of Photonics, Wiley, Aug. 1991.

White, Long Optical Paths of Large Aperture, Journal Optical Society America, vol. 32, May 1942, pp. 285-288.

White, Very Long Optical Paths in Air. Journal Optical Society America, vol. 66, No. 5, May 1976, pp. 411-416.

Yen et al., Operation of a Numerical Optical Data Processor, 1980, SPIE vol. 232, International Optical Computing Conference, 1980, pp. 160-167.

* cited by examiner

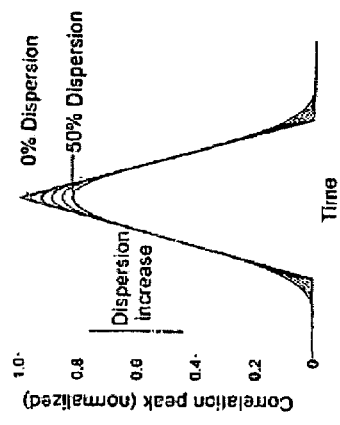
Figure 3a - Attenuation
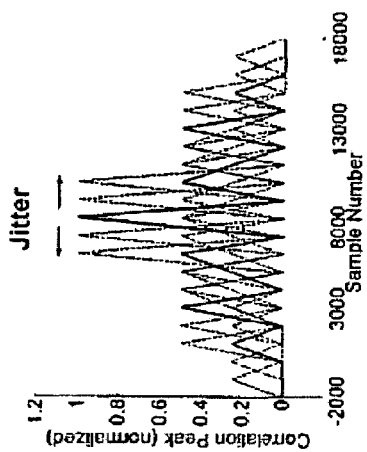
Figure 3b - Dispersion
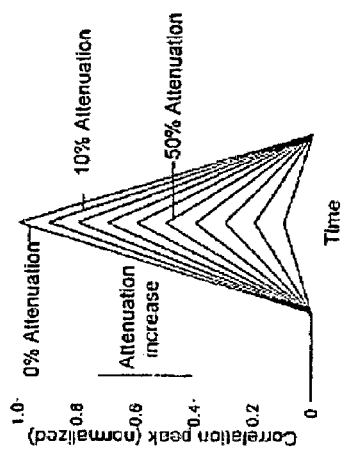
Figure 3c - Noise
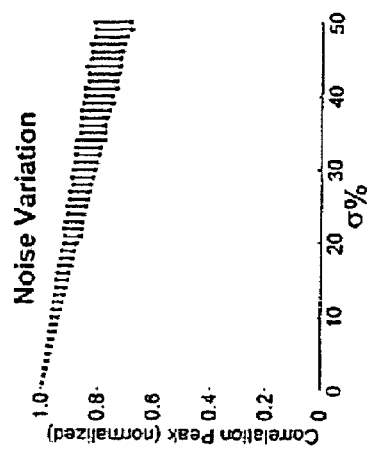
Figure 3d - Jitter

METHOD AND APPARATUS FOR MONITORING THE QUALITY OF OPTICAL LINKS

CROSS-REFERENCE TO RELATED APPLICATION

This application claims priority to U.S. Provisional Application entitled "Method and Apparatus for Monitoring the Quality of Optical Links," Ser. No. 60/430,214, filed Dec. 2, 2002, which is incorporated herein by reference in its entirety. The present application is further related to contemporaneously filed U.S. Non-Provisional Applications entitled "Optical Correlation Device and Method" and "Method and Apparatus for Combining Optical Beams," based on U.S. Provisional Application Ser. Nos. 60/430,207 and 60/430,213, respectively, each of which is incorporated herein by reference in its entirety.

TECHNICAL FIELD

The devices, methods and systems described herein relate generally to optical correlation and more particularly to temporal optical correlation.

BACKGROUND

In a fixed network, the availability and the quality of transmission paths change dynamically. These changes are even more frequent in networks consisting of mobile stations in a hostile environment. An effective network should know at all times what paths exist and which are the best among them, and switch rapidly to new paths as the situation changes.

When a bit stream is sent over any optical link, it may undergo degradation due to attenuation, dispersion, noise, and jitter, among other things. As the shape and amplitude of the bits change, the receiver's ability to reliably distinguish 1's from 0's is also reduced. In current technology, the degree of degradation is typically measured by sending a very long pseudo-random bit stream over a link and comparing the receiver's best guess for each bit with the original signal. At a typical phone line bit error rate (BER) of $10^{-9}$, a billion bits must be received on the average before a single error is detected, and usually at least 100 errors are required ($10^{11}$ bits) for the measurement to be statistically significant. For data links, BER's of $10^{-12}$ are not uncommon. To receive, then, the requisite $10^{14}$ bits, about 40 minutes are required at the fastest bit rate (40 Gb/s) and even longer for more typical links. Alternatively, one may measure the eye diagram, in which one collects many bits (thousands), converts them to an electronic signal, and superposes the various bits on an oscilloscope. Then sophisticated electronics examine a window inside the eye and look for transgressions of the signal into the opening of the eye. The advantage of the eye diagram technique is that attenuation, dispersion, jitter, and noise can all be determined from the shape of the eye, but it may require 20 to 30 seconds at the fastest bit rate, and the information has to be processed by a person, and then acted on.

SUMMARY OF THE INVENTION

The following presents a simplified summary of apparatus, systems and methods associated with monitoring the quality of optical links to facilitate providing a basic understanding of these items. This summary is not an extensive overview and is not intended to identify key or critical elements of the methods, systems, apparatus or to delineate the scope of these items. This summary provides a conceptual introduction in a simplified form as a prelude to the more detailed description that is presented later.

The present invention employs optical correletion to monitor and determine the Quality of Service (QoS) of an optical link. According to the present invention, a known signal is sent across the link. The received signal, which has acquired attenuation, dispersion, noise and jitter, is compared to the original signal using optical correlation, a technique that can be much faster than any electronic computation. The quality of information can be obtained in the time of four bits, which at a bit rate of 40 Gb/s is 100 picoseconds.

According to a first aspect of the present invention, a method for determining a quality of an optical link is disclosed. The method includes identifying a known signal and transmitting and receiving the signal over an optical link. The method also includes comparing the received signal to the known signal using optical correlation. The method further includes determining a quality of the optical link based on the comparison.

Certain illustrative example apparatus, systems and methods are described herein in connection with the following description and the annexed drawings. These examples are indicative, however, of but a few of the various ways in which the principles of the apparatus, systems and methods may be employed and thus are intended to be inclusive of equivalents. Other advantages and novel features may become apparent from the following detailed description when considered in conjunction with the drawings.

BRIEF DESCRIPTION OF THE DRAWINGS

Comprehension of the invention is facilitated by reading the following detailed description, in conjunction with the associated drawings, in which:

FIGS. 3A–3D are signal diagrams illustrating attenuation, dispersion, noise and jitter.

DETAILED DESCRIPTION

Figure 1:
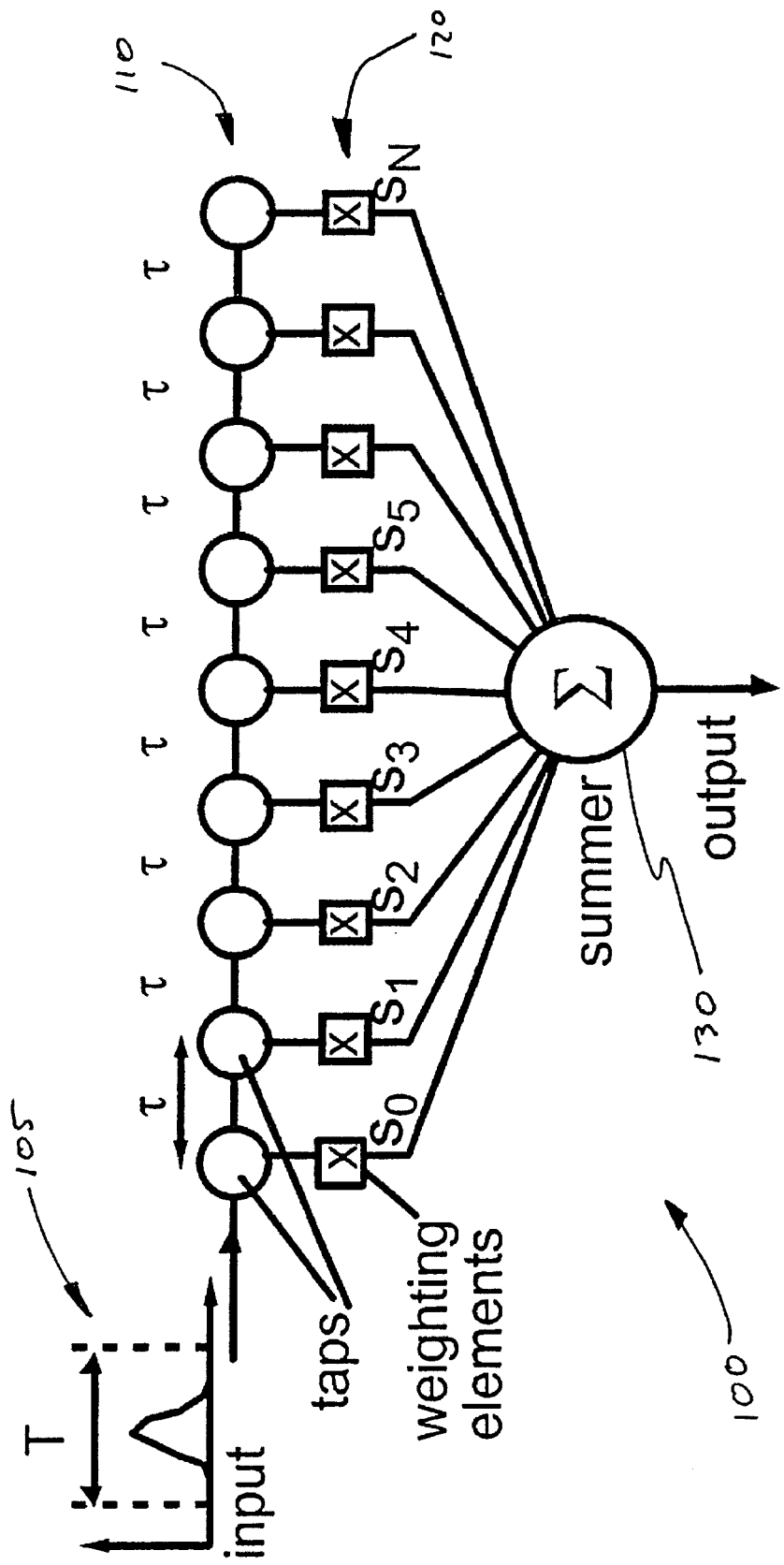
FIG. 1 is a schematic block diagram of a prior art correlator.

Optical correlators fall into two main categories, spatial correlators and temporal correlators. FIG. 1 shows a typical correlator (also called a matched filter, adaptive filter, or transversal filter). It consists of three elements: a tapped delay line, a series of weights $s_k$, and a summer. Each tap produces a replica of the input signal with a delay that it is some integer multiple of the basic delay increment $\tau$. The weighting elements are a series of phase shifters or amplitude changing elements (or a combination). The summing device is labeled $\Sigma$. Each of these time-shifted replicas from the tapped delay line is multiplied by a weight, which may be either a phase (complex) weight, or amplitude weight, or a combination. In optical correlation, a processor is said to be coherent if the weights are complex and interference is used to combine the signals, and incoherent if the weights are amplitude-only. The time-shifted and weighted signals are summed, and this combination of processes produces a correlation—the input signal is correlated with an arbitrary function that is implemented in the series of weights chosen. The resulting signal is a measure of how similar the incoming signal is to the reference signal encoded in the weights.

Figure 4:
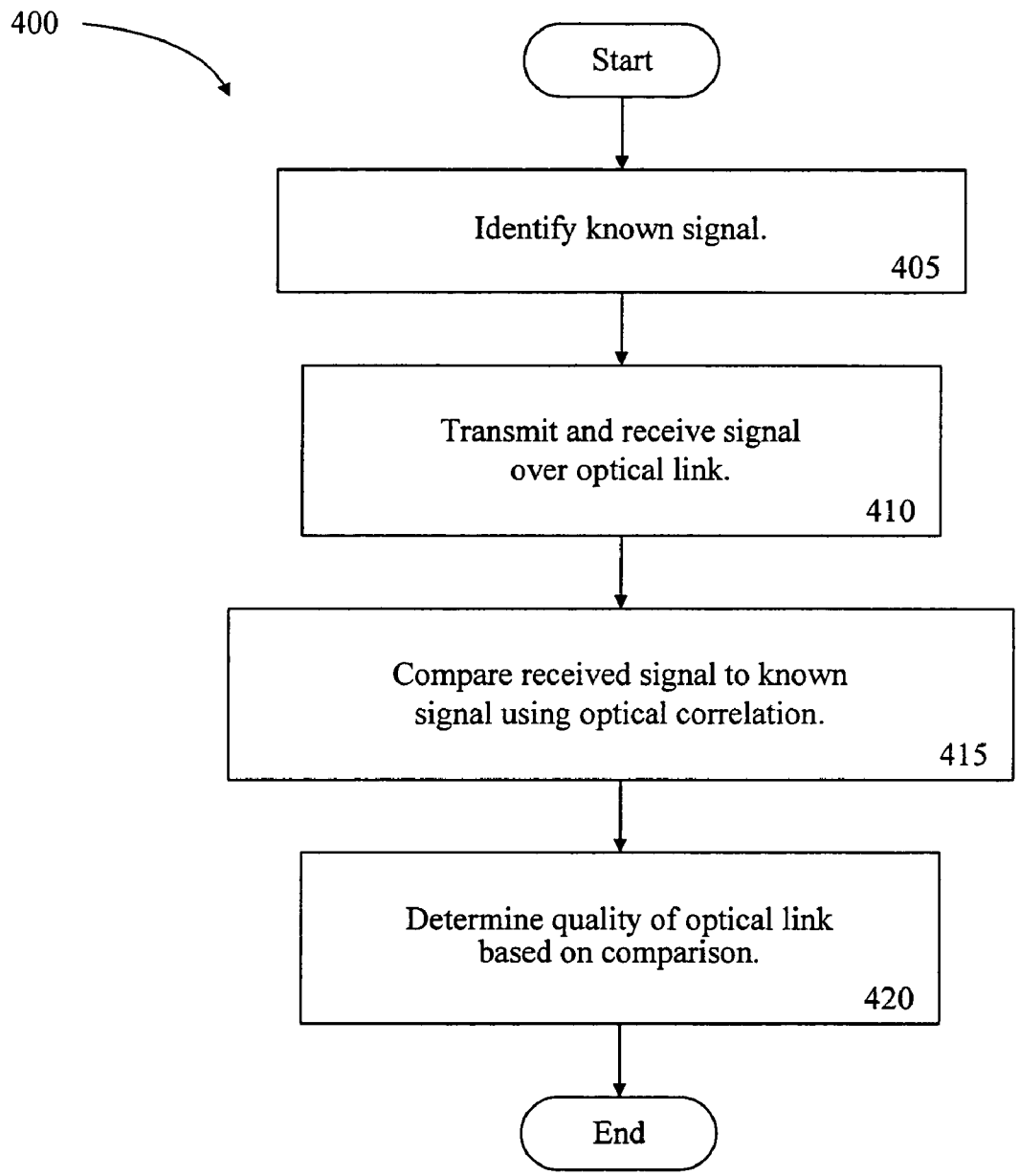
FIG. 4 is a flowchart illustrating an example methodology for determining the quality of an optical link.

Referring first to FIG. 4, there is illustrated an example methodology 400 for determining the quality of an optical link. At block 405, a known signal is identified for use in the methodology. At block 410, the known signal is transmitted and received over the optical link to be monitored. According to block 415, the received signal is compared to the known signal using optical correlation techniques, described in greater detail below. The quality of the optical link is then determined at block 420 based on the results of the comparison performed at block 415.

According to one embodiment, the correlation of the received signal r(t) with the known signal s(t), also referred to as the sent signal, is performed where t represents time.

The cross-correlation function:

$$c(t) = \int_{-\infty}^{\infty} s(t) r(t-\tau) dt \quad (1)$$

is a measure of how similar r(t) and s(t) are. A correlation can be implemented in a discrete system by sampling the received signal N times: as:

$$c(t) = \sum_{k=0}^{N-1} s_k r(t - k\tau_k) \quad (2)$$

Here, the sent signal is represented as discrete weights $s_k$. In cases of amplitude, or incoherent correlation, the weights will be 1's and 0's. The received signal is replicated N times. The first duplicate is shifted in time by one increment, the second is shifted by two increments, and so on. Each time-shifted replica of $r_k(t)$ is multiplied by a weight $s_k(t)$, and the resulting products are summed. The larger N is, the higher resolution the correlation and the more accurate the measurement.

Figure 5:
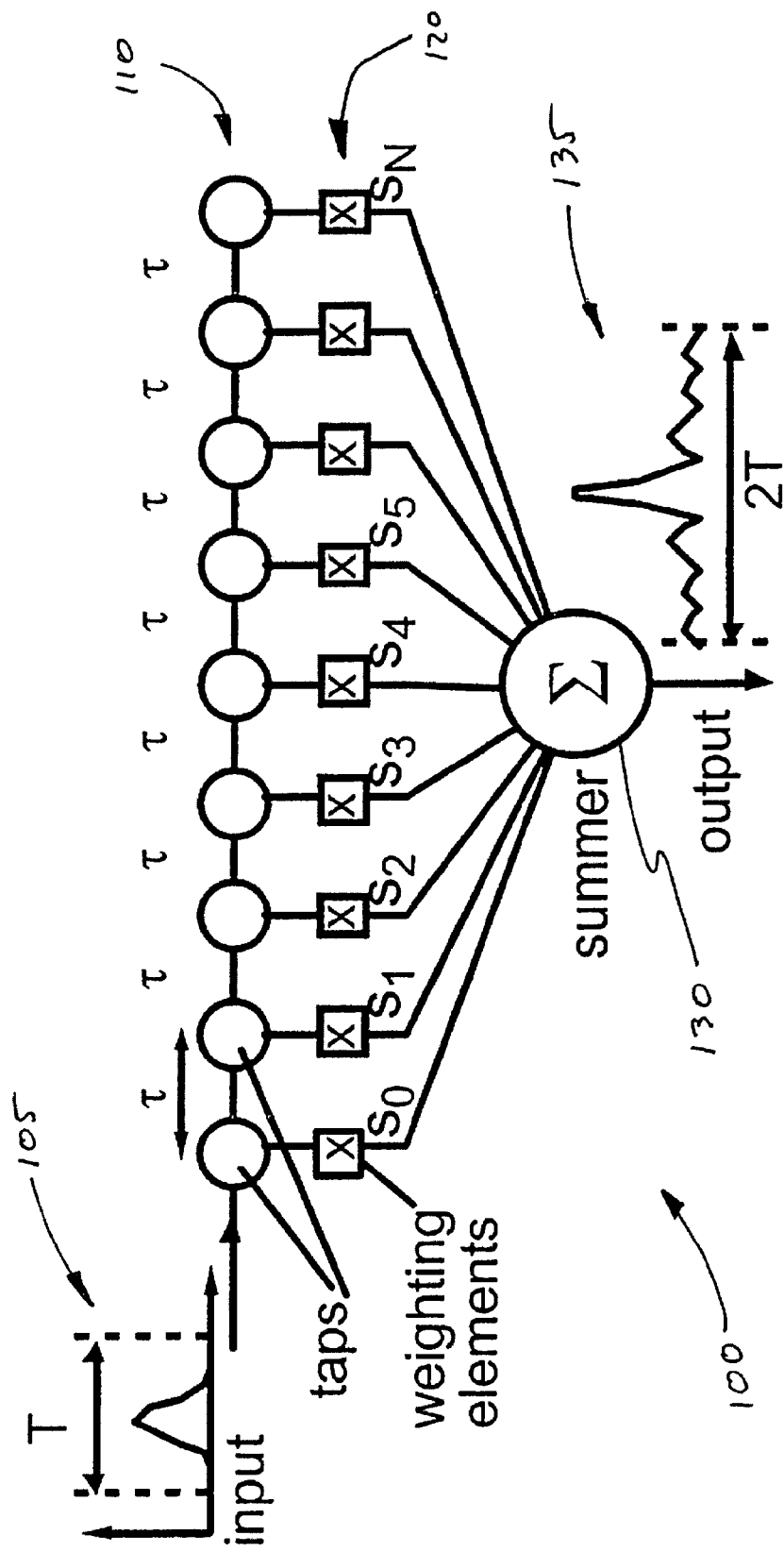
FIG. 5 is a schematic block diagram showing an exemplary implementation of the methodology for determining the quality of an optical link of FIG. 4 using the correlator of FIG. 1.

Referring now to FIGS. 1 and 5, there is illustrated an example correlator 100 which may be used by the present invention. Of course, an alternate correlator such as the optical correlator described in U.S. Provisional Application Ser. No. 60/430,207, for example, may also be used by the present invention. The received signal 105 is sent to a tapped delay line 110. At each tap, a small amount of the power is siphoned off. There is a time delay $\tau$ between each tap. Each of the signal replicas, which should all be of substantially the same amplitude, is then given a weight $s_k$. The weights 120 can be real, implemented with amplitude weights, or complex, using phase shifters, possibly in combination with amplitude weights. For digital signal monitoring for quality of service, the $s_k$'s will be either 1's or 0's.

The resulting correlation function 135, has a length in time of twice the input time period. This time is actually set by, and may vary according to, the design of the tapped delay line 110.

Figure 2:
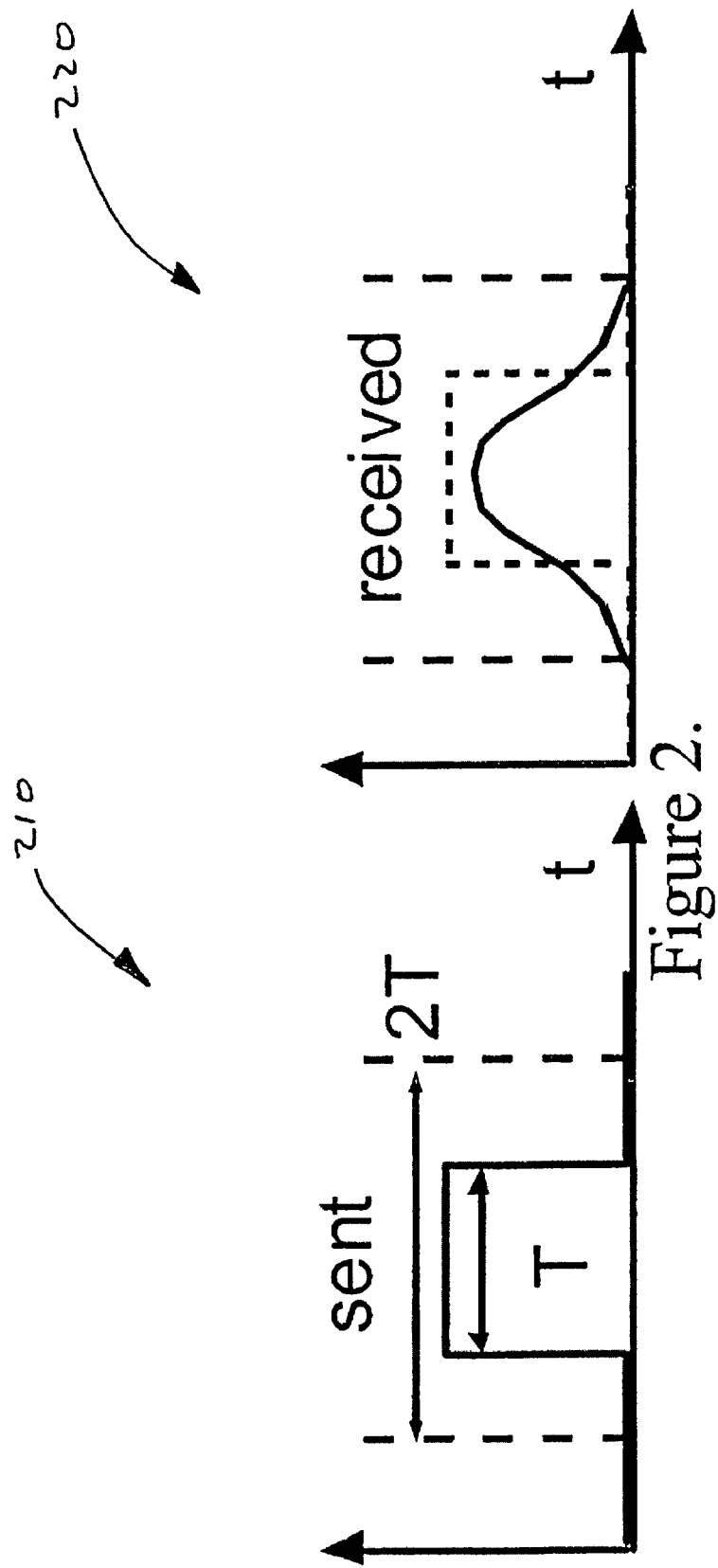
FIG. 2 is a signal diagram depicting an example sent or known signal transmitted over an optical link and a corresponding example received or degraded known signal associated with the optical link.

In one possible configuration, one can send a test signal consisting of a "1" bit with "zero" on either side, as illustrated by signal diagram 210 of FIG. 2. The total signal time is 2 T, since here only one half of each zero is sent. Longer "zero" periods of a full bit may be used for extremely degraded signals. A received signal of interval 2 T is sampled, where T is the bit period, and the resulting correlation function will occupy a time 4 T. If the two signals are identical, Equation (2) becomes an autocorrelation, and has a sharp peak in the center, and low side lobes. If the signals are less well matched, the peak decreases and the information on either side of the peak increases. Signal diagram 220 of FIG. 2 shows the shape of the pulse at the "receive" end of the link. It indicates that the received signal is degraded, namely attenuation and dispersion are shown.

Referring now to FIGS. 3A–3D, there is illustrated the resulting correlation functions for received signals showing only attenuation (3A) and only dispersion (3B). Note that fifty percent dispersion is defined as the point at which half the energy lies outside the original pulse. It can be seen that attenuation reduces the height of the correlation peak, while dispersion both reduces the peak and changes its shape. This much information can be obtained in a single correlation time 4 T.

Noise and jitter must be measured statistically over multiple correlations. FIG. 3C shows the variation in the peak amplitude as a function of noise with a Gaussian distribution of standard deviation $\sigma$. As illustrated in FIG. 3D, jitter is manifested as a variation in the location of the peak, shown here for an 8-bit duration.

The resolution with which the correlation can be done depends on the number of taps in the tapped delay line of the correlator. If the data rate is already as fast as electronics can switch, then an electronic tapped delay line is useless as it could produce at most one sample per bit period. Therefore, the present invention employs an optical correlator to perform the correlation. An optical tapped delay line can produce delay times that are arbitrarily small, depending as they do only on the difference in path lengths inside the delay line, rather than on any switching function. Thus, one can produce hundreds of thousands of taps during the time an electronic transmission of a single bit. That is, even the fastest possible bit stream can be sampled with hundreds of samples per bit resolution using optical techniques.

The correlation results in an optical time-varying signal, which may then be converted to an electronic signal for thresholding, or thresholded optically. If the bit rate is 40 Gb/s, the total length of the correlation signal in our example is 100 ps. A simple thresholding operation can determine whether the peak exceeds some minimum standard, and thus provide an ultra-high speed general evaluation of the link quality.

At the same time, the correlation signal can be replicated and subjected to other processing in parallel. For example, to determine the level of dispersion, and to isolate its effects from those of attenuation, one may wish to evaluate the curvature of the correlation peak. An optical correlator or optical matched filter can perform this function as well. By correlating the received, and presumably dispersed pulse, with the triangle function expected from an un-dispersed pulse, the peak of that correlation will directly reflect the amount of deviation from the ideal. Thus, this information can be obtained in the next 8 T (200 ps for a 40 Gb/s signal).

Alternatively, standard transversal filtering techniques can be used to evaluate the shape of the first correlation function, for example to take its derivatives. The correlation device can be used as a transversal filter by varying the weights appropriately. One might decide to perform multiple filtering tasks to separate attenuation and dispersion effects, for example.

To obtain noise and jitter information, one would evaluate the variation in peak height and location over a number of samples. It takes many bit periods, perhaps hundreds or thousands, to collect a statistically significant sampling. By employing an optical correlator, this task can be accomplished much faster, perhaps in nanoseconds to microseconds, compared to traditional techniques that require minutes.

Finally, it should be noted that when a zero and a one are transmitted, as in FIG. 2, the corresponding weights for the correlation are also 1's and 0's. In incoherent correlators, this amounts to an amplitude weight of either "pass the beam" or "block the beam." In the optical correlator, the light beams that will be blocked do not need to be generated at all, and thus the resolution of the correlator is actually twice the number of taps in the delay line.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A method for determining a quality of an optical link, comprising:
    identifying a known signal;
    transmitting the known signal over the optical link using a transmitting device associated with the optical link;
    receiving a degraded known signal using a receiving device associated with the optical link, the degraded known signal resulting from degradation of the known signal due at least in part to the transmitting over the optical link;
    comparing the degraded known signal to a reference signal using optical correlation, the reference signal being a suitable encoded representation of the known signal; and
    determining a quality of signal of the optical link based on the comparison.

2. The method of claim 1, wherein comparing includes correlating the degraded known signal r(t) with the reference signal s(t), where t represents time, using the function $c(t)=\int_{-\infty}^{\infty} s(t)r(t-\tau)dt$, where $\tau$ represents a time delay.

3. The method of claim 1, wherein comparing includes optical correlation implemented in a discrete system by sampling the degraded known signal N times, according to the function $$c(t) = \sum_{k=0}^{N-1} s_k r(t - k\tau_k),$$

where $\tau$ represents a time delay.

4. The method of claim 1, wherein the determining includes determining an attenuation associated with the optical link.

5. The method of claim 1, wherein the determining includes determining a dispersion associated with the optical link.

6. The method of claim 1, wherein the determining includes determining a noise associated with the optical link.

7. The method of claim 1, wherein the determining includes determining a jitter associated with the optical link.

8. The method of claim 1, wherein the receiving includes sending the degraded known signal to a delay line having a plurality of taps producing a plurality of tapped signals and the comparing includes applying a predetermined weight to each of the plurality of tapped signals, the corresponding plurality of predetermined weights relating the reference signal to the known signal.

9. The method of claim 1, wherein the optical correlation is completed in approximately four bit periods.

10. The method of claim 1, wherein the optical correlation is completed in approximately eight bit periods.

11. The method of claim 1, wherein the determining includes evaluation of a curvature of a correlation peak function.

12. The method of claim 1, wherein the determining includes evaluation of a shape of a first correlation function.

13. The method of claim 1, wherein the determining includes evaluation of a peak height and peak location in a correlation function over a plurality of samples.

14. A method for determining a quality of an optical link, comprising:
    identifying a known signal;
    transmitting the known signal over the optical link using a transmitting device associated with the optical link;
    receiving a degraded known signal using a receiving device associated with the optical link the degraded known signal resulting from degradation of the known signal due at least in part to the transmitting over the optical link;
    correlating the degraded known signal to a reference signal using optical correlation, the reference signal being a suitable encoded representation of the known signal; and
    determining a quality of the optical link based on the correlating.

15. The method of claim 14, wherein the determining includes at least one of determining an attenuation associated with the optical link and determining a dispersion associated with the optical link.

16. The method of claim 14, wherein the determining includes determining a noise associated with the optical link.

17. The method of claim 14, wherein the determining includes determining a jitter associated with the optical link.

18. A method for determining a quality of an optical link, comprising:
    identifying a known signal;
    transmitting and the known signal over the optical link using a transmitting device associated with the optical link;
    receiving a degraded known signal using a receiving device associated with the optical link, the degraded known signal resulting from degradation of the known signal due at least in part to the transmitting over the optical link;
    correlating the degraded known signal to a reference signal using optical correlation; and
    determining a quality of the optical link based on the correlating;
        wherein the reference signal is a suitable encoded representative of the known signal.

19. The method of claim 18, further including:
    sending the degraded known signal to a delay line having a plurality of taps, a corresponding plurality of weighting elements associated with the reference signal, and a summer;

producing a plurality of time-shifted signals associated with the degraded known signal and the plurality of taps;

producing a plurality of weighted signals associated with the plurality of weighting elements and the plurality of time-shifted signals; and summing the plurality of weighted signals to produce a resulting signal;

wherein the plurality of weighting elements and the corresponding plurality of weighted signals define a function relating the reference signal to the known signal such that the resulting signal is indicative of the quality of the optical link.

20. The method of claim 18, further including:

receiving the degraded known signal at an optical correlator;

producing a plurality of time-shifted signals, each time-shifted signal delayed in time from the degraded known signal via a delay line having a plurality of successive taps, each successive tap producing a time-shifted signal that is delayed by a basic delay increment from the preceding signal;

applying a predetermined weighting element associated with the reference signal to each time-shifted signal to produce a plurality of weighted signals, wherein the combined weighting elements define a function for the reference signal relating the reference signal to the known signal; and summing the plurality of weighted signals to produce a resulting signal indicative of the quality of the optical link.

* * * * *

UNITED STATES PATENT AND TRADEMARK OFFICE
CERTIFICATE OF CORRECTION

PATENT NO. : 7,236,238 B1 Page 1 of 1
APPLICATION NO. : 10/726771
DATED : June 26, 2007
INVENTOR(S) : Arjan Durresi et al.

It is certified that error appears in the above-identified patent and that said Letters Patent is hereby corrected as shown below:

Col. 6, line 26, please insert a comma --,-- after the word "link".

Col. 6, line 47, delete "and".

Signed and Sealed this

Eighteenth Day of September, 2007

JON W. DUDAS
*Director of the United States Patent and Trademark Office*